United States Patent [19]

Le Bouder

[11] 4,152,580
[45] May 1, 1979

[54] ROTARY MACHINE ELECTRONICS SUPERVISORY AND CONTROL APPARATUS

[75] Inventor: Maurice A. Le Bouder, Nimes, France

[73] Assignee: Fernotex Fernost-Textilhandel, Austria

[21] Appl. No.: 692,316

[22] Filed: Jun. 3, 1976

[30] Foreign Application Priority Data

Jun. 20, 1975 [FR] France .................. 75 20181

[51] Int. Cl.² .............................................. G07C 3/04
[52] U.S. Cl. ............................. 235/92 PD; 235/92 T; 235/92 FQ; 235/92 R
[58] Field of Search ........ 235/92 FQ, 92 PD, 92 CT, 235/92 T, 103, 92 NT

[56] References Cited

U.S. PATENT DOCUMENTS

| | | | |
|---|---|---|---|
| 3,510,632 | 5/1970 | Strandberg | 235/92 PD |
| 3,686,484 | 8/1972 | Ciemochowski | 235/92 FQ |
| 3,793,512 | 2/1974 | Lorenzen | 235/92 PD |

Primary Examiner—Joseph M. Thesz
Attorney, Agent, or Firm—Lewis H. Eslinger

[57] ABSTRACT

Apparatus for supervising the operation of a rotary machine such as a heat engine driving an electric generator, pump, etc., includes electronic circuits responsive to the alternating output of a tachometer-type alternator for recording performance details, such as speed, running hours, running hours in excess of normal speed, running hours with improper parameters (oil or water pressure or temperature), these electronic circuits being powered by rectifying the alternator output.

1 Claim, 3 Drawing Figures

ROTARY MACHINE ELECTRONICS SUPERVISORY AND CONTROL APPARATUS

BACKGROUND OF THE INVENTION

1. Field of the Invention

This invention relates to electronic supervisory and control apparatus for rotary machines.

High-power rotary machines, for example heat engines driving ships, generator sets, pumps and so on, require systematic control of certain operating parameters of which the values must not exceed certain limits, for example the temperature, the pressure of oil or of cooling water, or the speed in the case of heat engines.

In the case of breakdown it is of great interest to have a record of the number of operating hours of the machine and in particular a selective record of the running hours or number of rotations under abnormal operating conditions. Such records allow responsibility to be established in the case of breakdown and permit certain defects to be remedied.

In addition, it is of interest to automate the starting operations of heat engines, that must be commanded in sequence at exact times, as well as the procedures for emergency stopping in case of a defect, or for a normal stop.

2. Description of the Prior Art

At present the surveillance of heat engines is carried out by means of indicators or recorders for speed, running tests or of the values of some parameters, such as water or oil pressure or temperature, but there does not exist selective recording means retaining in a memory for example the number of operating rotations under certain abnormal conditions, so that in case of dispute as to the cause of a breakdown it is necessary to examine a large number of daily records, if they exist, to try to reconstitute the history of the machine.

As regards automation of starting or of stopping, these are generally effected by means of expensive circuits and relays contained in bulky cubicles. In practice, each cubicle is wired more or less by hand in order to carry out the automation shown on the basic diagram, which results in relatively long delays in manufacture, high charges for transport and handling of the cubicle and difficulties in adjustment during the initial setting-up and also for removing faults in the automation cubicles which can only be effected by qualified technicians.

On the other hand the existing apparatus for control and recording and the present automation cubicles consume a relatively large amount of energy which is taken initially from the mains or from a relatively high-power alternator driven by the machine.

Lastly, the existing arrangements require several movement sensors on the rotary machine to drive the tachymetric indicators and running-hour counters.

The object of the present invention is to provide electronic control arrangements for rotary machines that are much simpler than existing arrangements, of small bulk, may be mass-produced, are self-contained, require only a single movement sensor and allow the instantaneous speed to be known and also the recording of the total number of working rotations and the selective recording of the number of working rotations in different abnormal conditions and possibly combining several anomalies and which may automatically and sequentially control the starting and stopping operations.

Electronic arrangements for the control of a rotary machine are already known that comprise a low-power tachometer alternator driven by the machine, electronic shaping circuits connected to the alternator output which transform the alternating voltage supplied by the latter into rectangular impulses of constant duration, of which the frequency is proportional to that of the alternator, and electronic measuring circuits which count and record the rectangular pulses delivered per unit time (speed) and during predetermined periods (total operating time or time in over-speed or under abnormal conditions).

The object of the invention is achieved by means of an arrangement comprising in addition a rectifier connected to the alternator output which supplies the electronic circuits with low-voltage direct current.

Preferably, the arrangement further comprises a secondary battery which is connected to the rectifier output and which ensures the supply of direct current to the electronic circuits during starting of the rotary machine.

It is known to provide a rotary machine with circuits for selectively counting the number of machine rotations under abnormal conditions, for example with too-low oil or water pressure or above a predetermined speed.

In an arrangement in accordance with the invention, each selective counter circuit consists of at least one sensor, placed on the rotary machine, which automatically actuates a movable contact when an operating anomaly appears and a logic gate having several inputs. A first input of the gate is connected by way of a frequency divider to the output of the circuits for shaping the alternating voltage and the other inputs are each connected to one of the said movable contacts while the gate output is connected to a pulse counter.

An arrangement in accordance with the invention further comprises selective counter circuits for the number of operating rotations above a certain speed, which consist of a logic gate having an output that is connected to a pulse counter and at least two inputs of which one is connected to the output of the frequency divider and the other is connected to the output of a pulse integrator circuit.

An arrangement in accordance with the invention may additionally comprise circuits for automatically controlling the starting and stopping connected to outputs of frequency counters so that they control these operations sequentially.

The result of the invention is a novel product which forms a control arrangement for rotary machines. The advantages of this arrangement are as follows:

It is entirely contained in a unit of small bulk and of low weight, which may be soldered-up and therefore be made tamper-proof.

It is self-contained and does not require any external source of supply. In fact its consumption is very low, of the order of a few watts, and a very small permanent magnet tachometer alternator having a power of 10 to 20 watts is amply sufficient to supply the energy necessary for the control apparatus. A small dry battery having a capacity of a few ampere-hours is sufficient to store the energy necessary to feed the control circuits during the starting phase. Power consumption when the machine is stopped may readily be avoided by means of a relay that automatically isolates the control circuits that are not useful during stoppages. Lastly, if the controlled machine may remain idle for long periods, for example if it is a heat engine intended to drive an emergency generator set in case of supply failure, it is simple to connect to the mains a charger providing a continuous charge for the battery.

An important advantage of an arrangement in accordance with the invention lies in the fact that it allows all the functions of supervision, of recording and of automation, which were formerly obtained by means of indicating and recording apparatus and complex relay systems installed in specially wired control and automation cubicles, to be carried out simply and at less cost. It likewise permits simple selective recording combining several parameters, for example recording of the total number of operating revolutions, at a speed higher than 1000 r.p.m. with an oil pressure lower than a given value and a cooling-water temperature above a threshold level.

Such separate recordings of the more serious operating anomalies are very useful in case of breakdown to determine the true cause of the breakdown and to remedy it and likewise to establish the division of responsibility between constructor and user.

These selective recordings are obtained simply by combining, by means of logic gates, different items of information available in the arrangement, which allows selection, at no cost, of recordings appropriate to different machines while using arrangements that are largely identical.

Another advantage lies in the fact that it is possible to mass produce units containing all the circuits common to all the units, that is to say the battery and the circuits for charging it from the alternator (rectifier, transformer), circuits for pulse shaping, voltage dividers, counters, logic gates, connections for all the sensors placed on the machine and possibly only to modify certain connections to the inputs of the logic gates to obtain selective records corresponding to the particular application. Arrangements in accordance with the invention are therefore very flexible in application. On the other hand, as their cost and the charges for installation and wiring-up are reduced it is possible to contemplate the replacement of one unit by another in case of breakdown or even by way of preventive maintenance, which considerably reduces the cost of maintenance and of repair.

Another advantage of arrangements in accordance with the invention consists in the fact that the pulses from the frequency dividers after each starting of the rotary machine constitute a time-scale absolutely proportional by definition to the number of rotations made by the rotary machine and these pulses may readily be made use of to control automatically and in sequence the various phases of starting or of automatic delayed stopping of the machine, as well as the sequential putting into service of the different safety devices at required instants.

The following description refers to the drawings which represent (by way of example only) an embodiment of an arrangement in accordance with the invention.

Figure 1:
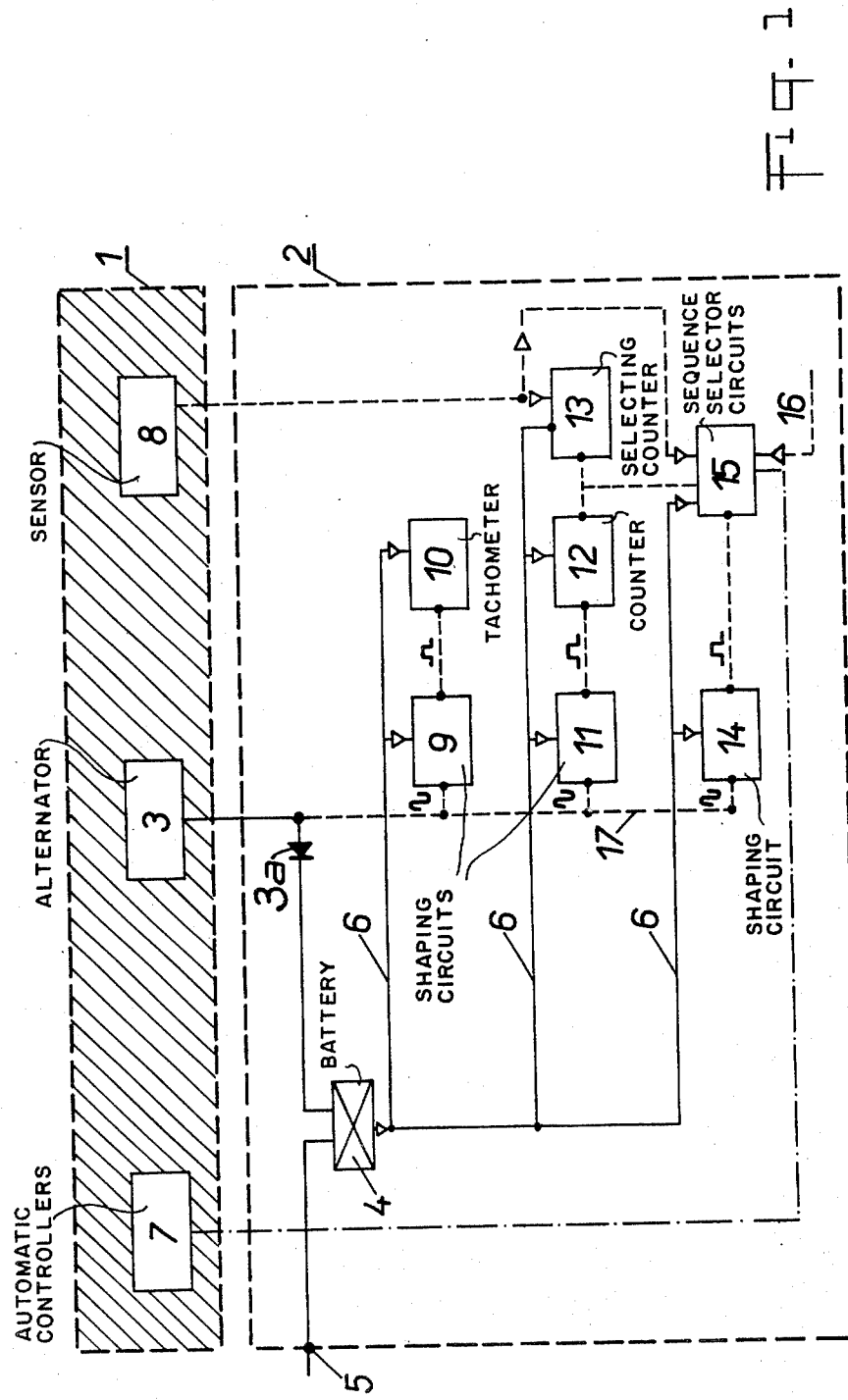
FIG. 1 is a schematic diagram of the arrangement.

The shaded rectangle 1 represents a rotary machine, for example a heat engine of which it is desired to control the operation. The broken-line rectangle 2 represents the unit in which the electronic circuits in accordance with the invention are situated.

The machine 1 drives a small permanent-magnet tachometer alternator 3, for example an alternator that supplies a no-load voltage of 125 volts at a frequency of 200 Hz when it rotates at 1000 r.p.m. The voltage supplied by the alternator and rectified by a rectifier 3a charges a small accumulator 4, of the dry battery type, having a capacity of several ampere-hours. A separate supply may possibly be connected to a terminal 5 to recharge the battery 4 rapidly from an external source of current. The battery 4 provides the supply current for all the electronic circuits through the intermediary of the conductors 6.

In periods of operation of the rotary machine 1, the amount of energy provided by the alternator 3 is higher than the consumption of energy by the circuits and the arrangement is therefore self-contained.

The machine 1 comprises devices 7 which automatically control starting, normal stopping and emergency stopping. It likewise comprises detectors or sensors 8 which monitor certain parameters of the operation independent of the speed, for example sensors for the pressure and temperature of the oil and of the cooling water.

The unit 2 is a unit of small bulk having a low weight of the order of some twenty kilograms.

It contains a first tachymetric recording chain 9, 10. The circuits 9, connected to the alternator output, are circuits for shaping rectangular signals. The circuits 10 measure the frequency of the pulses and determine the speed of the rotary machine. These circuits replace the arrangements for tachymetric monitoring, for example, tachometer generators, used at present to monitor the instantaneous speed.

The unit 2 comprises also a second chain 11, 12 and 13.

The circuits 11, connected to the alternator output, are signal shaping circuits yielding rectangular impulses. The circuits 12 are circuits for counting and recording the number of working hours.

The circuits 13, connected both to circuits 12 and to sensors 8, are circuits for determining and recording the durations of periods of abnormal operation.

The unit 2 further comprises a third chain including signal shaping circuits 14 yielding rectangular impulses and sequence selector circuits 15 which control the devices 7 in sequence. A lead 16 connected to the selector circuits 15 allows commands to be applied thereto.

On the basis of the overall diagram of FIG. 1, the details of the construction and operation of the various constituent parts will be hereinafter described.

The alternator 3 is a tachometer alternator driven by the rotary machine. The speed at which the alternator is driven is at a constant ratio, for example 1 or ½, to the speed of the machine.

This alternator is one of the essential features of the arrangement in accordance with the invention to which it supplies both the operating power and signals permitting supervision of the operation of the rotary machine 1.

The goal which is sought is to provide a self-contained control arrangement that is effective in all the operating regimes of the machine and in particular that of starting. The battery 4 is for example a 12-volt battery which supplies power at a voltage of 5 V and a maximum current of 0.2 amperes to the control circuits by way of voltage regulator arrangements.

It should be noted that a transformer and rectifier are in practice provided between the alternator 3 and the battery 4, as indicated by rectifier symbol 3a.

The power provided by the alternator is greater than that consumed by the circuits fed from the battery and the capacity of the battery, which may conveniently be of the order of 5 ampere-hours is generally sufficient to ensure continuity of supply during the starting period, so that the arrangement is self-contained. During waiting periods the power consumption is very small and the capacity of the battery is sufficient to maintain the arrangement in an operative condition for 500 hours. If the rotary machine to be controlled may be idle for long periods, as is the case for diesel engines intended for driving emergency generator sets, a trickle-charging circuit 5 for charging the battery from the supply network may be provided.

The frequency of the alternating voltage supplied by the alternator 3 is proportional to the speed of rotation of the rotary machine 1 and this frequency is made use of to effect supervision of the machine by numerical impulse counting.

The electronic chains forming the digital frequency dividers allow the counting to be carried out at frequency values compatible with the supervision to be effected.

The voltage generated by the alternator is sinusoidal and must first of all be shaped into rectangular signals with steep edges, forming pulses.

The voltage supplied by the alternator is first of all peak limited to reduce its maximum value to a value compatible with the correct operation of the electronic counting circuits. This limiting is carried out, for example, by a Zener diode associated with resistors. The limited voltage is then transformed into a rectangular signal by a Schmitt trigger which supplies a signal with steep edges at all times when the voltage is above a threshold. The duration tmT of the signal varies with the alternator frequency. The signal from the output of the trigger initiates a monostable trigger circuit which in turn provides steep-edged pulses of which the duration tmM does not depend upon the frequency. The monostable trigger is chosen to provide impulses of which the duration is less than one half-cycle of the alternator output voltage when the machine is turning at its maximum speed.

The frequency of the impulses leaving the monostable trigger may be measured, for example, by connecting the trigger output to a resistance connected in parallel with a capacitor. The direct voltage across the capacitor takes up a mean value which is the integrated value of all the pulses in a given time. By measuring the mean current in the resistance with a milliammeter a reading is obtained that is directly proportional to the instantaneous speed.

Figure 2:
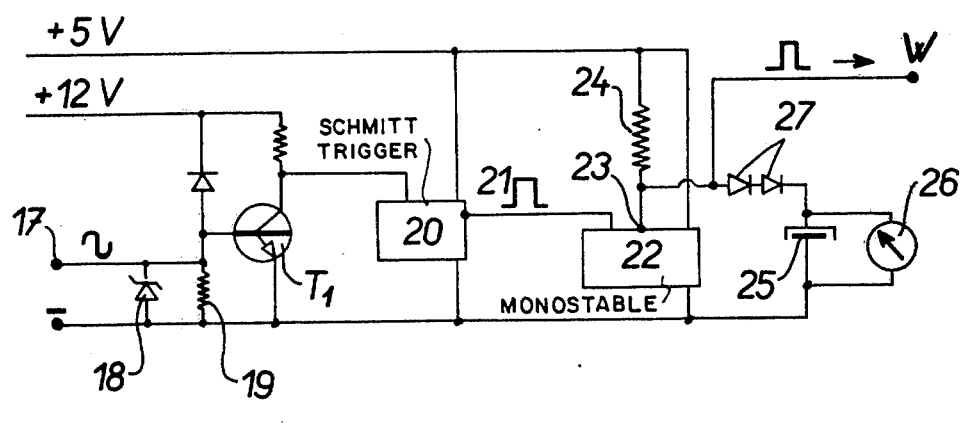
FIG. 2 is a simplified schematic circuit diagram of the signal shaping and tachometer indicator circuits.

FIG. 2 represents schematically one embodiment of the tachometer circuits bearing the references 9 and 10.

The sinusoidal voltage supplied by the alternator is received at terminal 17 and is limited by a Zener diode 18 connected in parallel with a resistance 19. The limited signal is applied to the base of a separating transistor T1 energized from a 12 V supply. The signal from the collector of the transistor is applied to the input of a Schmitt trigger 20. The output 21 of the trigger 20 is connected to the input of a monostable trigger 22. An output 23 of monostable trigger 22 is connected to a resistance 24 connected in parallel with a capacitor 25. A milliammeter 26 connected across the terminals of the capacitor 25 measures the value of the current flowing in the resistor 24, which is proportional to the instantaneous speed of the rotary machine. In order to obtain zero current during periods when the speed is zero, the small load due to the low residual output voltage is compensated by two diodes 27 of which the forward voltage drop is 0.8 V.

Figure 3:
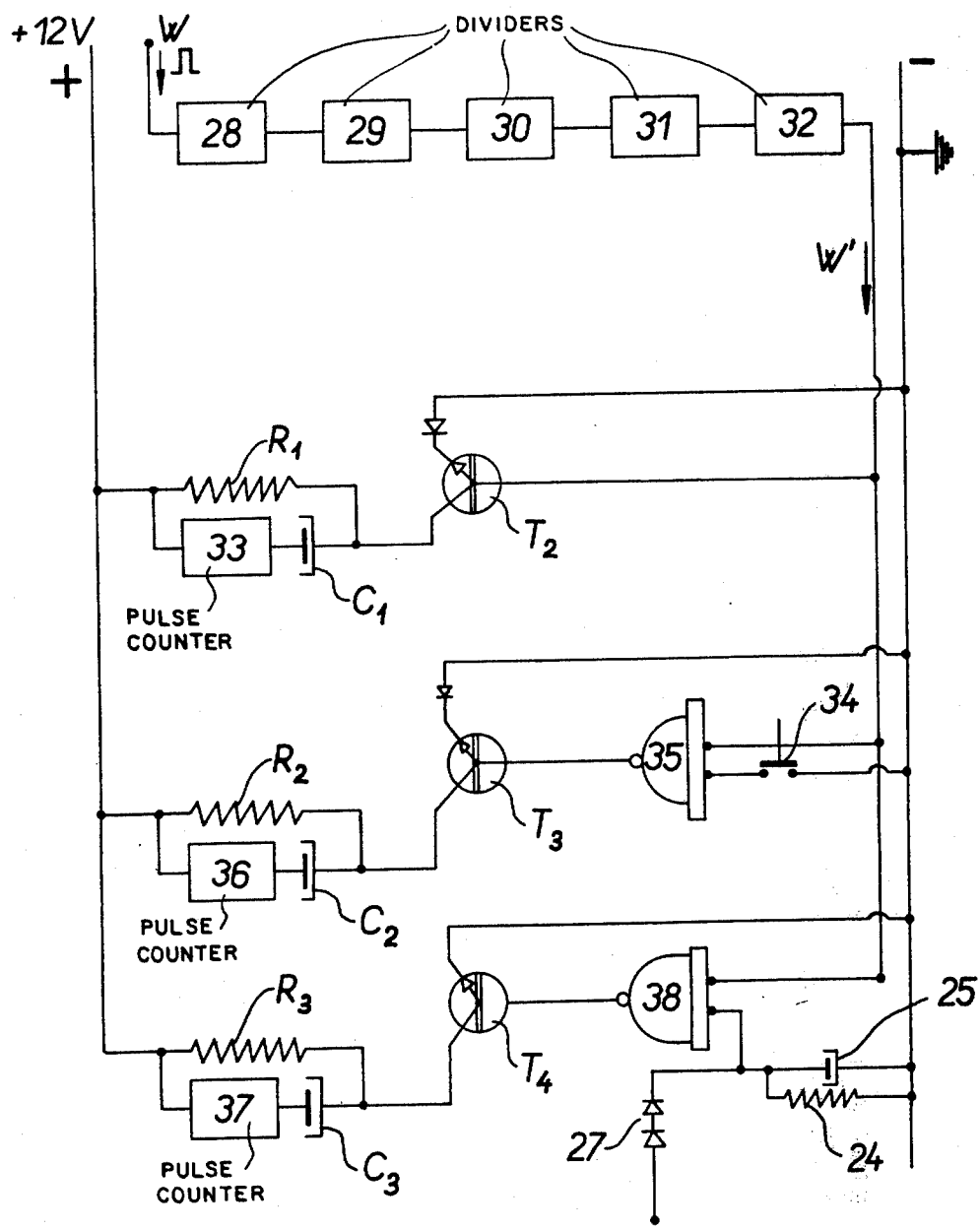
FIG. 3 is a simplified schematic circuit diagram of the counter circuits for counting the number of rotations and for selective counting.

FIG. 3 shows a schematic circuit diagram of the circuit chain 12, 13 of FIG. 1, which are the circuits for counting the running hours.

Circuits 12, 13 are preceded by shaping circuits 11 for forming rectangular signals, that are the circuits T1, 20 and 21 of FIG. 2.

The pulses W from the monostable trigger 22 are applied to cascade-connected frequency dividers, comprising for example five dividers 28, 29, 30, 31 and 32 which divide the frequency respectively by 3,6,6,10 and 10, giving in all a division by a factor of 1,080,000.

For an alternator providing a frequency of 300 Hz at 1500 r.p.m., or 10800 cycles per hour, each pulse W' at the output of the divider chain corresponds to 1/100th of a running hour under normal conditions.

The output of the divider chain is connected to a decimal pulse counter 33 by way of a transistor T2 connected as a switch.

The output of the transistor is connected to a high-capacitance capacitor C1 connected in series with the pulse counter 33. The capacitor C1 and the counter 33 are shunted by a resistor R1 of sufficiently high value that the discharge of the capacitor by way of the resistor is slow and does not trigger the pulse counter. The interval that separates the impulses from the last divider stage is of the order of 30 seconds and the capacitor has time to become discharged between two successive pulses. This arrangement of the counter limits the power consumption and allows the use of a dry battery and of a small, permanent-magnet alternator. This part of the circuit, which corresponds to unit 12 of FIG. 1, allows recording of the number of hours of normal running, or the number of rotations of the rotary machine. By using 6 digit counters, each division of which denotes 0.01 running hours or 10,800 rotations, a recording of up to 10,000 running hours may be made.

The unit 13 of FIG. 1 represents the selective recording of the number of hours or of operating rotations under certain conditions indicated by a sensor 8.

Circuits 13 comprise essentially a gate 35, for example a NAND gate with several inputs, that is, a gate equivalent to an AND gate followed by an inverter, which provides a high output if one at least of its inputs is at a low level. The pulses W' from the frequency divider are applied to one of the inputs of the NAND gate while another input is connected to the negative pole of the supply by way of a normally-closed contact 34 of a sensor responsive for example to the pressure or temperature of the oil or of the water.

The output of the NAND gate is connected by way of a transistor to the input of a pulse counter 36, connected in series with a capacitor C2, the series combination of capacitor and counter being shunted by a resistor R2. While the contact 34 is closed the output of NAND gate 35 is continuously at a high level and no pulse is recorded in the counter 36. When the operating conditions of the rotary machine become abnormal contact 34 opens and the counter 36 then records the pulses W' corresponding either to running hours or fractions of hours, or to a predetermined number of rotations of the machine while operating in an abnormal condition. The arrangement includes also further gates 35 and counters 36 with sensors 8, each counter thus recording the running time in the respective abnormal condition corresponding to that sensor, for example, time of running with low oil pressure or with high cooling water temperature. In case of breakdown, the respective counter allows the reasons for the breakdown to be known.

It is also possible to record the times of running at a certain speed, for example running time at a speed above 1000 r.p.m. This is the case for example with counter 37, which is connected in series with a capacitor C3, the series combination of capacitor and counter being shunted by a resistor R3. The counter is connected, by way of a transistor T4, to the output of a NAND gate 38. One of the inputs of gate 38 is connected to the output of the frequency divider chain. The other input is connected to receive the signal developed across the integrating capacitor 25 of FIG. 2. While the charge on the capacitor is too low, that is, when the speed of the rotary machine has not reached a predetermined threshold, the output of NAND gate 38 remains constant at a high level and counter 37 does not record.

By distinguishing between the totaliser counter recording all running hours and the counter recording running time at a speed higher than a threshold, the number of running hours at a speed below the said threshold.

It should be noted that it is merely necessary to use gates having more than two inputs, one fed with the output of the divider chain and the others with signals controlled by the appropriate sensors or circuits to obtain, for example, the number of running hours with low oil pressure at a speed above 1000 r.p.m.

The arrangement according to the invention allows information to be obtained as to the speed of the machine with reference to two predetermined thresholds, information as to the number of running hours and information as to the operating conditions of the machine.

By combining the information by means of gates it is thus easy to record at little cost the many items of selective information useful in determining the primal cause of a breakdown.

FIG. 3 illustrates an embodiment comprising NAND gates such as are commercially available as TTL (transistor-transistor logic) integrated circuits. The NAND gates may obviously be replaced by other gates fulfilling the same logic functions, for example OR gates or AND gates.

FIG. 1 shows a third chain 14, 15 of circuits for sequential control, for automation and for signalling. The practical embodiments of these circuits will vary with the type of rotary machine.

In the case of supervision of a heat engine, for example, the circuits should be arranged to take into account that the same condition of a sensor, for example the oil pressure sensor, has a totally different significance dependent upon whether or not the engine is running.

The sequential control circuits 14 and 15 allow the automatic and sequential control at desired instants of all the operations for starting the motor and then of automatically commanding either an emergency stop, while indicating the fault which has provoked this stop, or the normal stopping of the engine.

The arrangement according to the invention allows the counting of pulses taken from different pulse dividers 28–32, commencing with the starting of the motor, and thus of obtaining a succession of control signals corresponding exactly to one phase of operation, which allows the automatic starting sequences to be assured without any risk of incorrect operation, as well as the automatic stopping of the rotary machine.

It will be understood that the various elements of the circuits that have been described may be replaced by equivalent circuits fulfilling the same function and well known in the electronics field, without departing from the scope of the invention as defined by the appended claims.

What is claimed is:

1. A rotary machine supervisory and/or control apparatus comprising, low power alternator means, having an output, and being driven by the rotary machine for supplying alternating current at said output, electronic signal shaping circuit means connected to said alternator means for converting the waves of the alternating current supplied by the alternator means into rectangular pulses, electronic pulse counter means for counting and recording said pulses during predetermined periods, and rectifier means connected to said alternator means output and a battery connected between said rectifier and said electronic signal shaping means and said pulse counter means, which battery is charged by the direct current supplied by said rectifier and supplies said electronic signal shaping means and said pulse counter means with low voltage direct current during starting of the rotory machine.

* * * * *